United States Patent
Chen et al.

(10) Patent No.: US 9,298,307 B2
(45) Date of Patent: Mar. 29, 2016

(54) DISPLAY APPARATUS WITH TOUCH CONTROL FUNCTION AND OPERATION METHOD THEREOF

(71) Applicant: AU Optronics Corporation, Hsin-Chu (TW)

(72) Inventors: Yu-Ta Chen, Hsin-Chu (TW);
Chao-Chen Wang, Hsin-Chu (TW);
Shing-Ming Tai, Hsin-Chu (TW);
Chao-Chuan Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 308 days.

(21) Appl. No.: 13/905,269

(22) Filed: May 30, 2013

(65) Prior Publication Data

US 2014/0062918 A1    Mar. 6, 2014

(30) Foreign Application Priority Data

Aug. 31, 2012    (TW) .............................. 101131787 A

(51) Int. Cl.
*G06F 3/041*    (2006.01)
*G06F 3/044*    (2006.01)

(52) U.S. Cl.
CPC .............. *G06F 3/0416* (2013.01); *G06F 3/044* (2013.01); *G06F 3/0412* (2013.01)

(58) Field of Classification Search
None
See application file for complete search history.

(56) References Cited

U.S. PATENT DOCUMENTS

| 2010/0110040 | A1* | 5/2010 | Kim et al. | 345/174 |
| 2012/0050217 | A1* | 3/2012 | Noguchi et al. | 345/174 |
| 2012/0162124 | A1* | 6/2012 | Lin | 345/174 |
| 2012/0249476 | A1* | 10/2012 | Schwartz et al. | 345/174 |
| 2014/0049507 | A1* | 2/2014 | Shepelev et al. | 345/174 |

OTHER PUBLICATIONS

U.S. Appl. No. 61/683,542, filed Aug. 2012, Shepelev et al.*

* cited by examiner

*Primary Examiner* — Ilana Spar
*Assistant Examiner* — Kirk Hermann
(74) *Attorney, Agent, or Firm* — WPAT, PC; Justin King

(57) ABSTRACT

A touch display apparatus is disclosed in the disclosure. The touch display apparatus includes a panel module, a display driving circuit and a touch sensing circuit. The panel module includes pixel units, common electrode lines and a touch receiving line. The common electrode lines are disposed vertical to the touch response lines. The display driving circuit is coupled to the panel module to drive the pixel units. The display driving circuit is synchronized to the touch sensing circuit. The touch transmission signal for touch-sensing is transmitted via the common electrode line sequentially. In addition, a display-driving method is also disclosed.

16 Claims, 10 Drawing Sheets

디스플레이 APPARATUS WITH TOUCH CONTROL FUNCTION AND OPERATION METHOD THEREOF

DISPLAY APPARATUS WITH TOUCH CONTROL FUNCTION AND OPERATION METHOD THEREOF

RELATED APPLICATIONS

This application claims priority to Taiwan Application Serial Number 101131787, filed Aug. 31, 2012, which is herein incorporated by reference.

BACKGROUND

1. Field of Invention

The invention relates to a touch display apparatus. More particularly, the invention relates to a display apparatus which integrates a touch control function and a display-driving method which integrates touch signal control.

2. Description of Related Art

The touch display apparatus has advantages of convenience in operation, fast response speed and reduced space, and can provide a user with a more intuitive and convenient operation method, so that the touch display apparatus become an important input interface, and is widely applied in various consumer electronics, such as e-books, personal digital assistants (PDAs), smart mobile communication devices, notebook computers, sales management systems and the like.

In general, a conventional touch display apparatus consists of a display panel and a touch module disposed above the display panel, which is also referred to as an out-cell touch display apparatus. In the out-cell touch display apparatus, a piece of touch glass (e.g., a tin indium oxide conductive plate or other transparent conductors) is additionally disposed on a surface of a color filter substrate of the display panel, and a transparent touch module adheres to the display panel, so as to achieve the touch and display functions at the same time.

A typical out-cell touch display apparatus includes two groups of touch signal lines (such as a touch driving line and a touch receiving line) which are vertically staggered with each other, so as to form a touch sensing array disposed on an independent touch glass. A touch control circuit transmits a touch transmission signal through a group of touch driving lines (also referred to as TX lines) and feeds back a touch receiving signal through a group of touch receiving lines (also referred to as RX lines) to perform subsequent determination.

Currently, the above-described touch hardware has been widely applied to a portable electronic apparatus, and in order to improve the mobility of the portable apparatus, the current industry is mostly pursuing an in-cell touch display apparatus. In the in-cell touch display apparatus, a signal sensing line required for touch sensing is directly integrated to a display driving circuit, so as to achieve the touch sensing and display driving functions with the minimum space and cost.

The arrangement of the touch glass is omitted in the in-cell touch display apparatus, but it needs to integrate the signal lines used for the touch control function to the structure of the display panel. It is an important issue of the in-cell touch display apparatus how to enable the touch sensing function and the display driving function to be operated stably without mutual interference.

SUMMARY

An aspect of the disclosure provides a touch display apparatus, including a panel module, a display driving circuit, a control circuit and a touch sensing circuit. The panel module includes a plurality of pixel units, a plurality of common electrode lines and a plurality of touch receiving lines, wherein the common electrode lines are disposed perpendicular to the touch receiving lines. The display driving circuit coupled to the panel module is configured for driving the pixel units. The control circuit coupled to the display driving circuit and the common electrode lines is configured for driving the common electrode lines. The touch sensing circuit is coupled to the control circuit and the touch receiving lines. The display driving circuit generates a driving synchronous pulse corresponding to a pixel driving period of each of the pixel units. The control circuit receives the driving synchronous pulse and then the control circuit is synchronized with the touch sensing circuit. After the synchronization the control circuit selectively and sequentially transmits a touch transmission signal to the common electrode lines according to a touch control signal fed back from the touch sensing circuit.

Another aspect of the disclosure provides a touch display apparatus, including a panel module, a display driving circuit and a touch sensing circuit. The panel module includes a plurality of pixel units, a plurality of common electrode lines and a plurality of touch receiving lines, wherein the common electrode lines are disposed perpendicular to the touch receiving lines. The display driving circuit coupled to the panel module and the common electrode lines is configured for driving the pixel units. The touch sensing circuit is coupled to the display driving circuit and the touch receiving lines. The display driving circuit generates a driving synchronous pulse corresponding to a pixel driving period of each of the pixel units. The touch sensing circuit receives the driving synchronous pulse and then is synchronized with the display driving circuit. After the synchronization the display driving circuit selectively and sequentially transmits a touch transmission signal to the common electrode lines according to a touch control signal fed back from the touch sensing circuit.

A further aspect of the disclosure provides a display-driving method for a display apparatus which integrates a touch control function. The display apparatus includes a plurality of pixel units, a plurality of common electrode lines, a plurality of scan lines, a plurality of touch receiving lines, a display driving circuit and a touch sensing circuit. The display-driving method includes: generating a driving synchronous pulse corresponding to a pixel driving period of each of the pixel units; analyzing the driving synchronous pulse and generating at least one pulse synchronous signal; synchronizing frequencies of the touch sensing circuit and the display driving circuit based on the at least one pulse synchronous signal and generating a touch control signal; sequentially generating touch transmission signals based on the touch control signal and transmitting the touch transmission signals to the common electrode lines; and sensing a touch receiving signal through the touch receiving lines.

DETAILED DESCRIPTION

Figure 1:
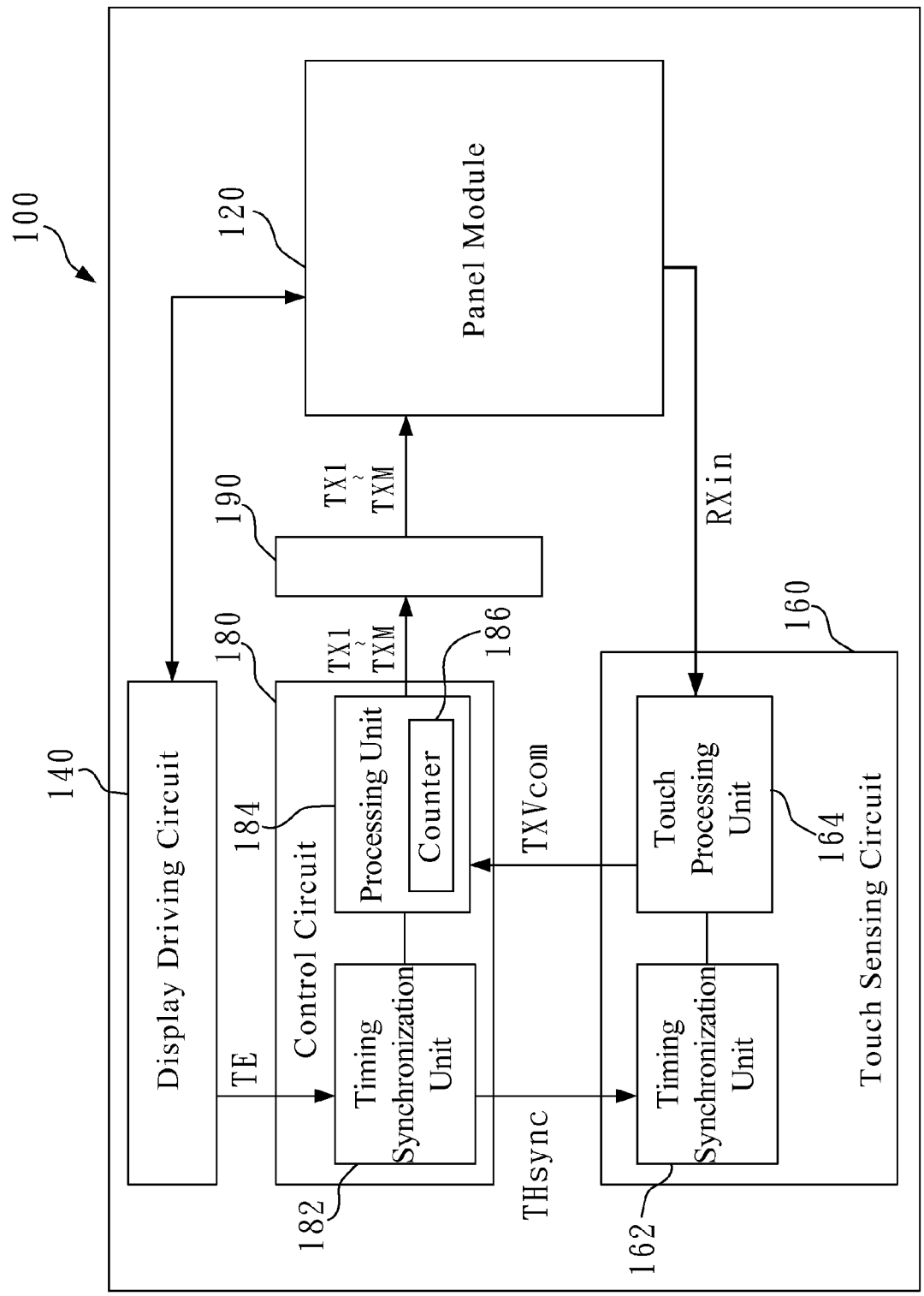
FIGS. 1 and 2 respectively illustrate schematic views of a touch display apparatus according to an embodiment of the disclosure.

Embodiments of the disclosure are disclosed below with reference to the drawings. For purpose of clear illustration, various practical details will be illustrated along with other things in the description below. However, it should be understood that the disclosure is not limited to these practical details. In other words, in some embodiments of the disclosure these details in practice are unnecessary. Furthermore, for purpose of simplifying the drawings, some conventional common structures and elements are illustrated in the drawings in a simply schematic manner.

Figure 2:
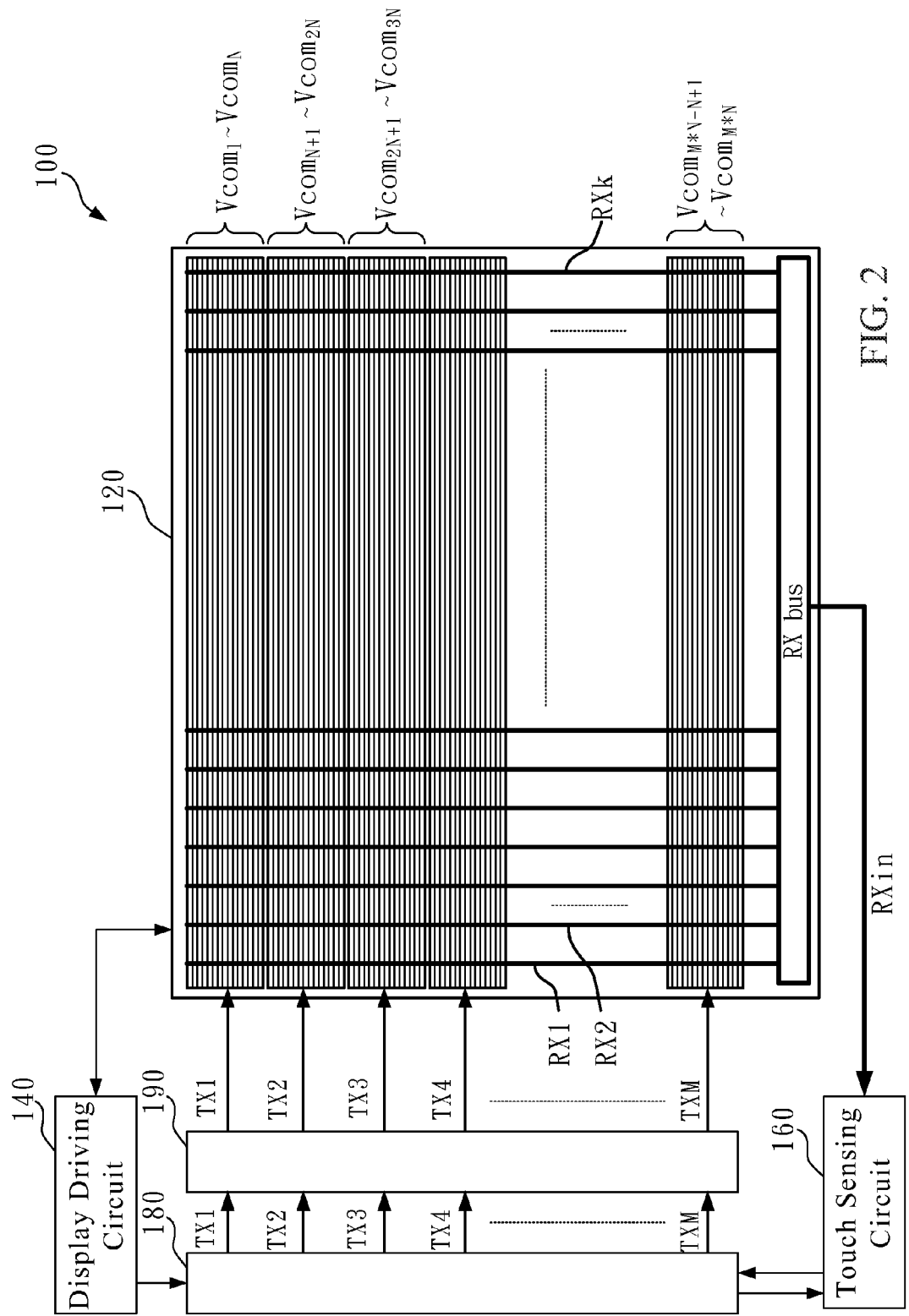

Referring to FIGS. 1 and 2, they respectively illustrate schematic views of a touch display apparatus 100 according to an embodiment of the disclosure. The touch display apparatus 100 includes a panel module 120, a display driving circuit 140, a touch sensing circuit 160 and a control circuit 180.

In this embodiment, the panel module 120 includes a plurality of pixel units (not shown), a plurality of common electrode lines (e.g., $Vcom_1$-$Vcom_{M*N}$ shown in FIG. 2), and a plurality of touch receiving lines (e.g., RX1-RXk shown in FIG. 2). The common electrode lines $Vcom_1$-$Vcom_{M*N}$ are disposed perpendicular to the touch receiving lines RX1-RXk. In this embodiment, the common electrode lines $Vcom_1$-$Vcom_{M*N}$ totally include M*N common electrode lines. The M*N common electrode lines are divided into M groups, and each group of the common electrode lines includes N common electrode lines, wherein M and N are positive integers. In the example of FIG. 2, a first group of common electrode lines includes common electrode lines $Vcom_1$-$Vcom_N$, and a second group of common electrode lines includes common electrode line $Vcom_{N+1}$-$Vcom_{2N}$, and so on. It should be noted that the common electrode lines of the above embodiment is totally divided into M groups, each of which includes N common electrode lines, but the disclosure is not limited to this specific grouping method. For example, each group of common electrode lines also may include only one common electrode line.

Figure 3:
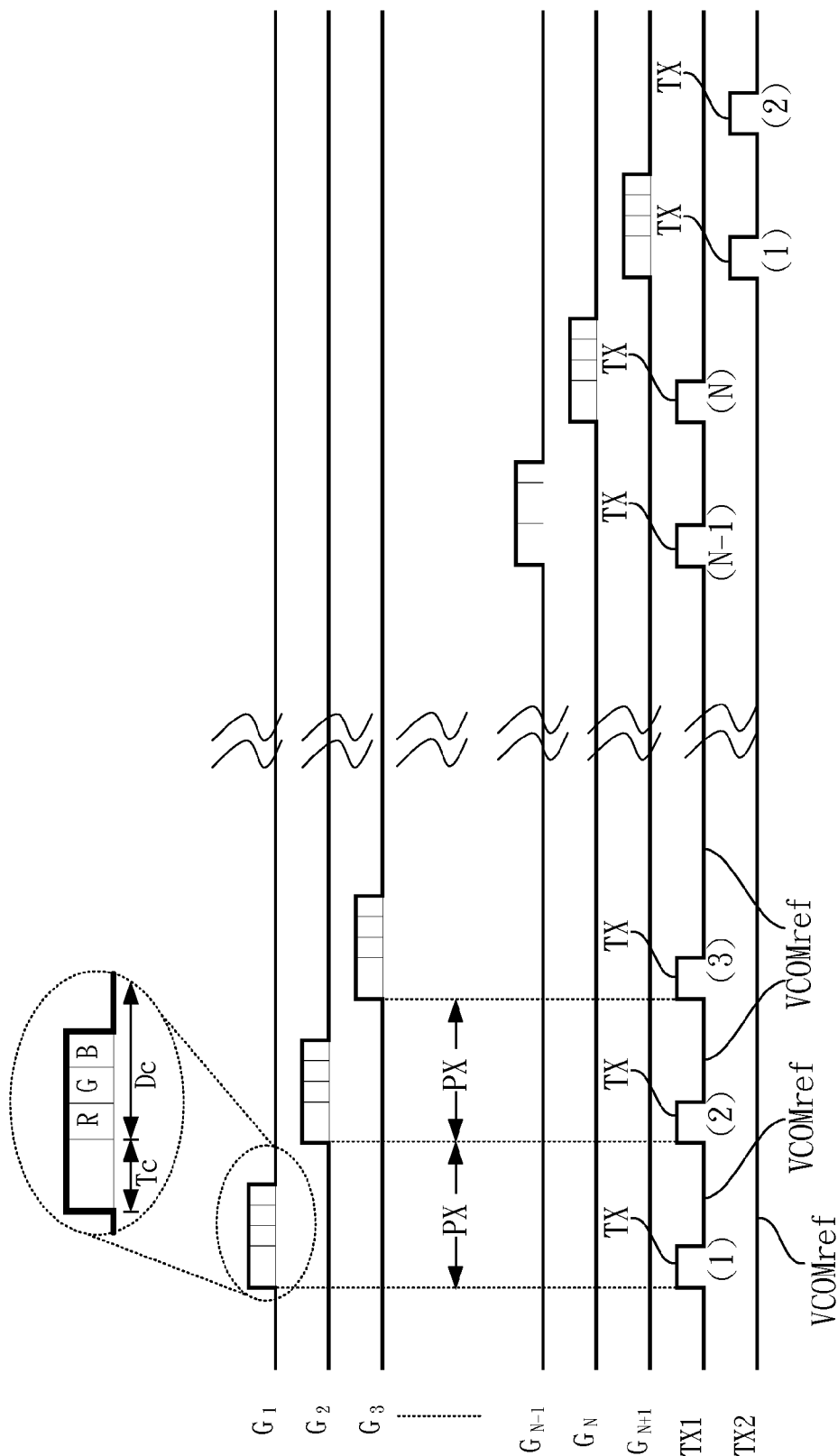
FIGS. 3 and 4 respectively illustrate schematic views of timing of partial signals of a touch display apparatus according to an embodiment of the disclosure.
Figure 4:
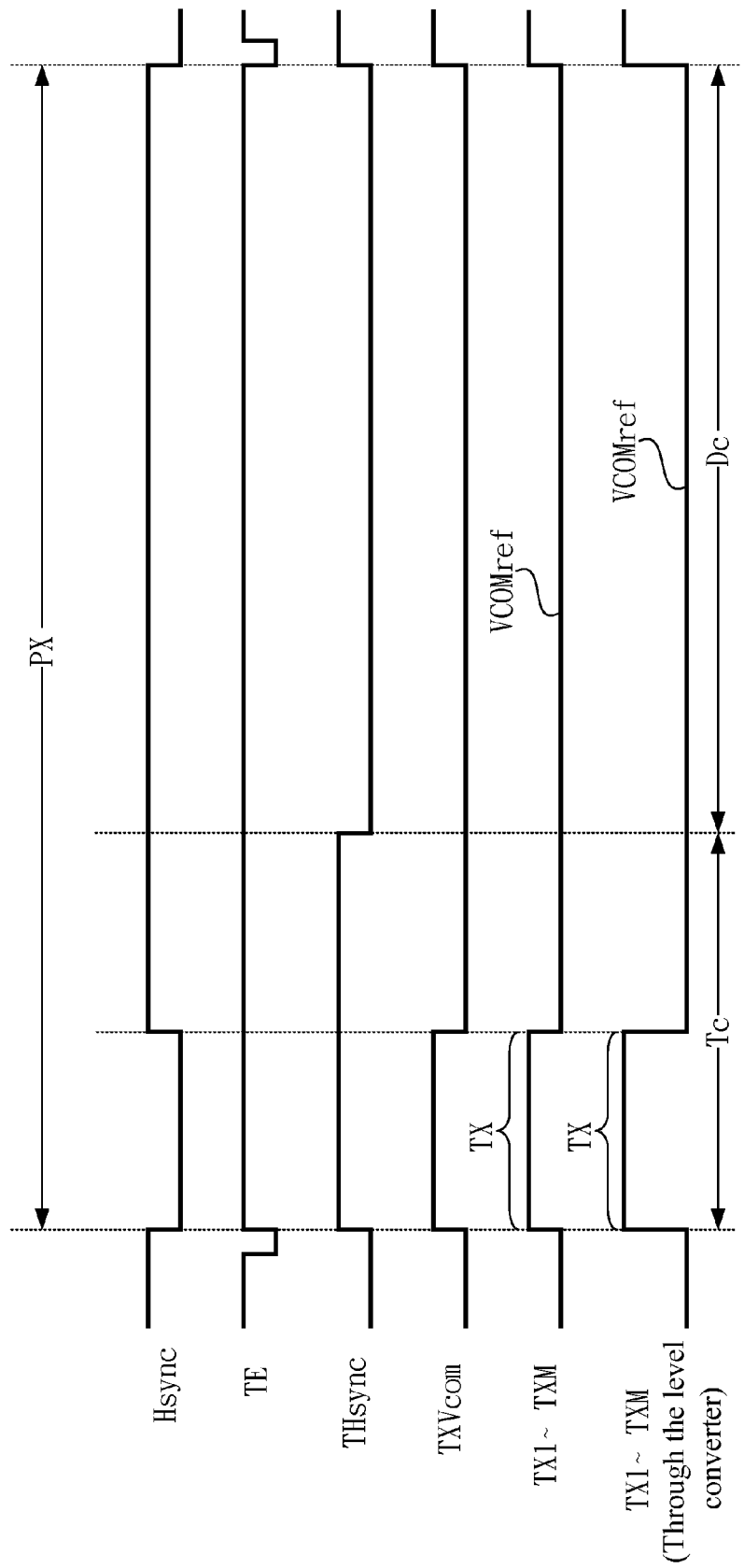

Referring both to FIGS. 3 and 4, they respectively illustrate schematic views of signal timing of each signal line included in the touch display apparatus 100 according to an embodiment of the disclosure. FIG. 3 illustrates a schematic view of signals on scan lines $G_1, G_2, \ldots G_{N+1}$ and touch transmission lines TX1 and TX2. FIG. 4 further illustrates a graph of a relationship among the signals.

The display driving circuit 140 is coupled to the panel module 120. The panel module 120 further includes a plurality of data lines (not shown) corresponding to the plurality of scan lines (e.g., the scan lines $G_1, G_2, \ldots G_{N+1}$ shown in FIG. 3), used for driving the pixel units of the panel module 120. For example, the display driving circuit 140 may include a gate driving circuit, a source driving circuit or other necessary display driving components. The display effect is achieved by the pixel units through various driving lines of the panel module 120 (e.g., the scan lines $G_1, G_2, \ldots G_{N+1}$ shown in FIG. 3), the details of which are well known to those of skills in the art and will not be described here anymore. It should be noted that the above-described common electrode lines $Vcom_1$-$Vcom_{M*N}$ are a part of the driving lines and can be used for providing common electrode voltages required by the pixel units and controlling operation polarity of the pixel unit and level of the reference voltage.

The control circuit 180 coupled to the display driving circuit 140, a touch sensing circuit 160 and common electrode lines $Vcom_1$-$Vcom_{M*N}$ is configured for driving common electrode lines $Vcom_1$-$Vcom_{M*N}$. The touch sensing circuit 160 coupled to the control circuit 180 and the touch receiving lines RX1-RXk is configured for acquiring a touch receiving signal RXin through the touch receiving lines.

In the disclosure, the touch transmission signal used for touch sensing and a common electrode voltage used for a display function are time-sharing transmitted through the common electrode lines $Vcom_1$-$Vcom_{M*N}$, and details thereof are described as follows.

As shown in FIG. 4, the display driving circuit 140 generates related driving synchronous signals when the display operation is performed, typically for example a horizontal synchronization signal Hsync, a vertical synchronization signal Vsync and a driving synchronous pulse TE. Generally, the display driving circuit 140 generates a driving synchronous pulse TE corresponding to a pixel driving period of each pixel unit (e.g., PX shown in FIGS. 3 and 4). The driving synchronous pulse TE is used for indicating and corresponding to an initial time point of the pixel driving period of each pixel unit.

A timing synchronization unit 182 included in the control circuit 180 receives the driving synchronous pulse TE from the display driving circuit 140, accordingly analyzes the driving synchronous pulse TE to generate at least one pulse synchronous signal (in this embodiment is the pulse synchronous signal THsync shown in FIG. 4) and transmits the pulse synchronous signal to a timing synchronization unit 162 of the touch sensing circuit 160, and thus the control circuit 180 is synchronized with the touch sensing circuit 160.

That is, the control circuit 180 receives the driving synchronous pulse TE from the display driving circuit 140 and then obtains the current timing setting of the display function, and transmits the pulse synchronous signal THsync to the touch sensing circuit 160 to perform pulse synchronization. This the above-described mechanism, the control circuit 180 can establish a synchronous timing relationship between the display driving circuit 140 with the display function and the touch sensing circuit 160 with the touch control function.

Subsequently, the timing synchronization unit 162 of the touch sensing circuit 160 is synchronized with the control circuit 180 and the display driving circuit 140 based on the pulse synchronous signal (e.g., THsync shown in FIG. 4), and a touch control signal TXVCOM is fed back to a processing unit 184 of the control circuit 180 through a touch processing unit 164 of the touch sensing circuit 160.

As shown in FIG. 4, the pixel driving period PX corresponding to each pixel unit includes a touch section Tc and a display section Dc. In the touch section Tc the control circuit 180 selectively and sequentially transmits the touch transmission signal (e.g., TX shown in FIG. 4) to the common electrode lines $Vcom_1$-$Vcom_{M*N}$ according to the touch control signal TXVCOM.

The processing unit 184 of the control circuit 180 sequentially transmits the touch transmission signal TX through a group of touch transmission lines TX1-TXM to N common electrode lines of a group of common electrode lines $Vcom_1$-$Vcom_{M*N}$.

Furthermore, the touch display apparatus 100 further includes a level converter 190 coupled between the control circuit 180 and the common electrode lines $Vcom_1$-

Vcom$_{M*N}$, for adjusting voltage levels of touch transmission signals TX on the touch transmission lines TX1-TXM. For example, the level converter 190 can adjust a voltage value of the touch transmission signal TX from 3.3 volts (V) to 5.5 V, as shown in FIG. 4.

In an embodiment, in the touch sections Tc of successive N pixel driving periods, the control circuit 180 transmits the touch transmission signal TX generated according to the touch control signal TXVCOM to N common electrode lines in one group.

In this embodiment, the touch control signal TXVCOM fed back to the processing unit 184 of the control circuit 180 by the touch processing unit 164 of the touch sensing circuit 160 is used for determining a time point for transmitting the touch transmission signal TX; and the control circuit 180 determines transmitting the touch transmission signal TX to which group of common electrode lines (e.g., Vcom$_1$-Vcom$_N$, Vcom$_{N+1}$-Vcom$_{2N}$, ... or Vcom$_{M*N-M+1}$-Vcom$_{M*N}$) through which one of the touch transmission lines TX1-TXM. In this embodiment, the processing unit 184 of the control circuit 180 includes a counter 186. The counter 186 starts to count when the control circuit 180 transmits the touch transmission signal TX to N common electrode lines in one group. When successive N pixel driving periods PX are reached, the control circuit 180 transmits the touch transmission signal TX to N common electrode lines in the next group and the counter 186 recounts.

For example, referring to FIG. 3, in the first to (N)th pixel driving periods PX, the control circuit 180 transmits the touch transmission signal TX to N common electrode lines of Vcom$_1$-Vcom$_N$ through the touch transmission lines TX1. From the (N+1)th pixel driving period PX, the control circuit 180 transmits the touch transmission signal TX to N common electrode lines of Vcom$_{N+1}$-Vcom$_{2N}$ through the touch transmission lines TX2, wherein the numbers used in the brackets (1), (2) ... (N) of FIG. 3 represent corresponding readings of the counter 186.

The foregoing paragraphs describe a method for transmitting the touch transmission signal TX in the touch section Tc of the pixel driving period PX. Additionally, in the display section Dc the display driving circuit 140 drives the pixel units through data lines and scan lines (e.g., scan lines G$_1$, G$_2$, ... G$_{N+1}$ shown in FIG. 3). As shown in FIG. 3, in the display section Dc the scan lines G$_1$, G$_2$, ... G$_{N+1}$ can operate switching components of red, green, blue and the like pixels, and meanwhile the control circuit 180 sets the common electrode lines Vcom$_1$-Vcom$_{M*N}$ at a common voltage level VCOMref (as shown in FIGS. 3 and 4).

As such, the control circuit 180 can time-sharing control the common electrode lines Vcom$_1$-Vcom$_{M*N}$ to transmit the touch transmission signal TX in the touch section Tc and set the common electrode lines Vcom$_1$-Vcom$_{M*N}$ at a common voltage level VCOMref in the display section Dc. Moreover, the control circuit 180 performs timing synchronization through the timing synchronization unit 182, the timing synchronization unit 162 of the touch sensing circuit 160 and the display driving circuit 140, so that the touch transmission signal TX for the touch sensing function and the common voltage level VCOMref for the display function can be synchronized at a correct pulse and share a same common electrode line. The above-described embodiments can achieve the above-mentioned functions by adding the control circuit 180 to the display driving circuit 140 and the touch sensing circuit 160 of the prior art, with a minimum change, but the disclosure is not limited to this.

Figure 5:
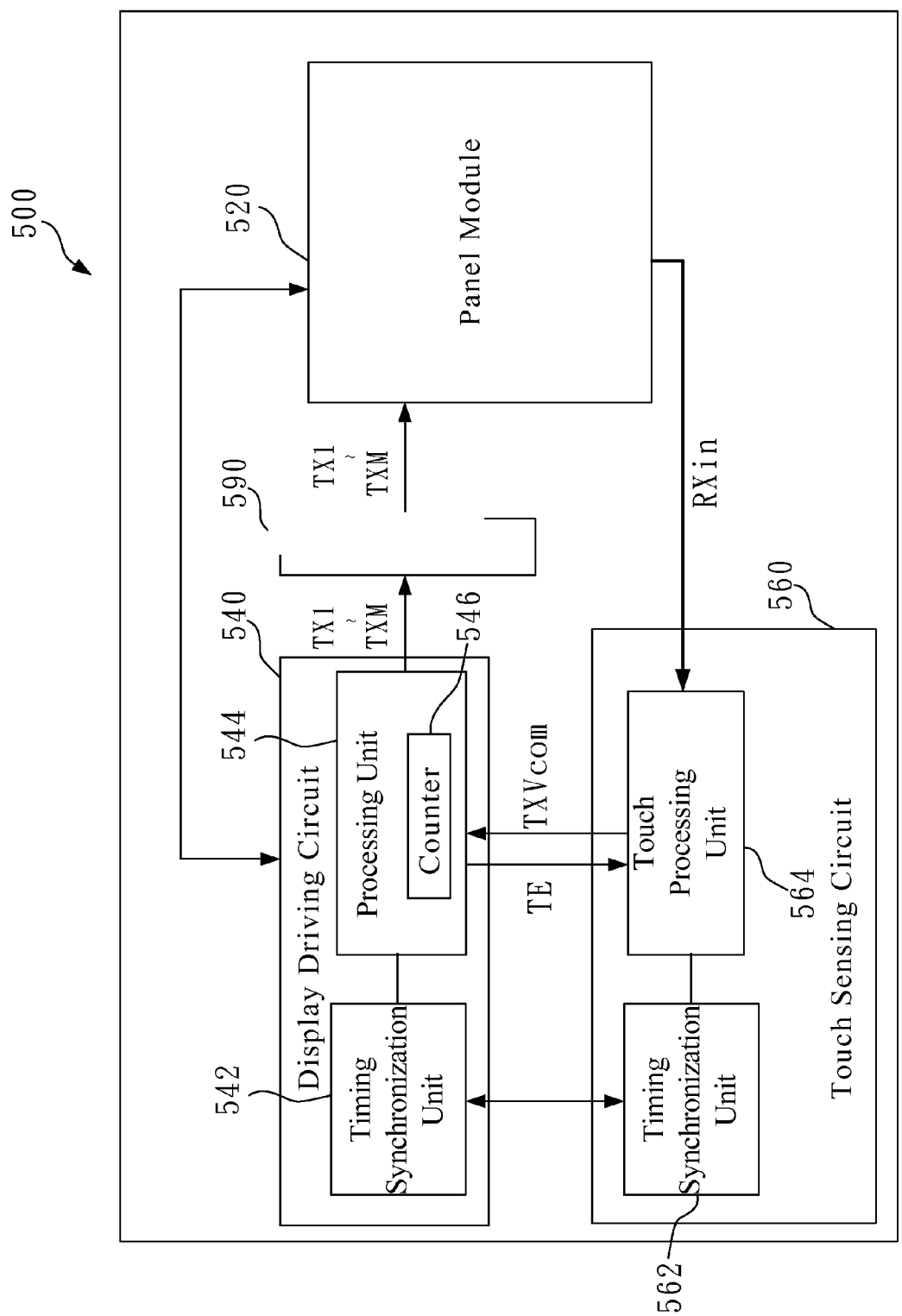
FIGS. 5 and 6 respectively illustrate schematic views of a touch display apparatus according to another embodiment of the disclosure.
Figure 6:
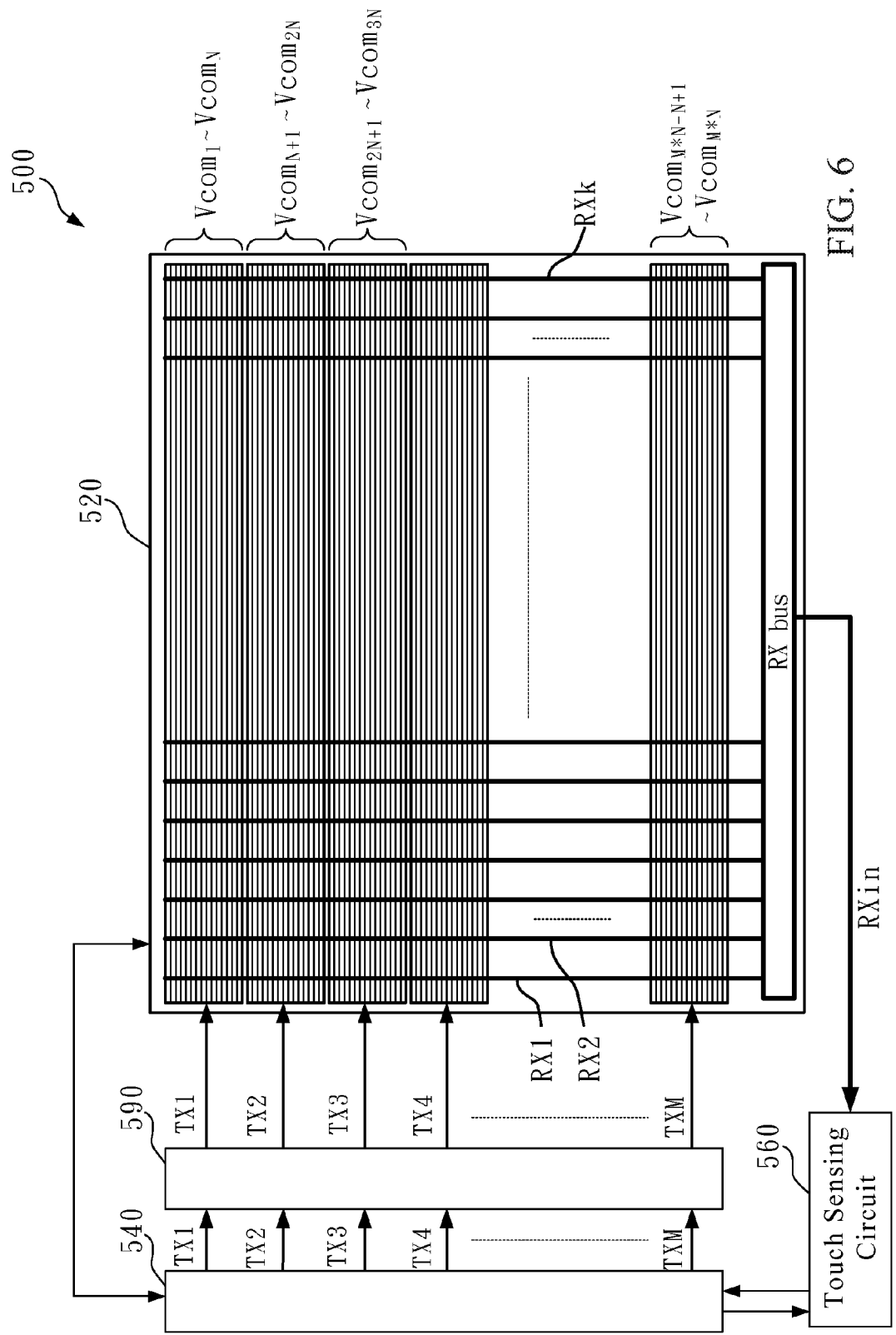

Subsequently, referring to FIGS. 5 and 6, they respectively illustrate schematic views of a touch display apparatus 500 according to another embodiment of the disclosure. The touch display apparatus 500 includes a panel module 520, a display driving circuit 540, and a touch sensing circuit 560. The largest difference from the previous embodiment is that no additional control circuit is added into the touch display apparatus 500.

Figure 7:
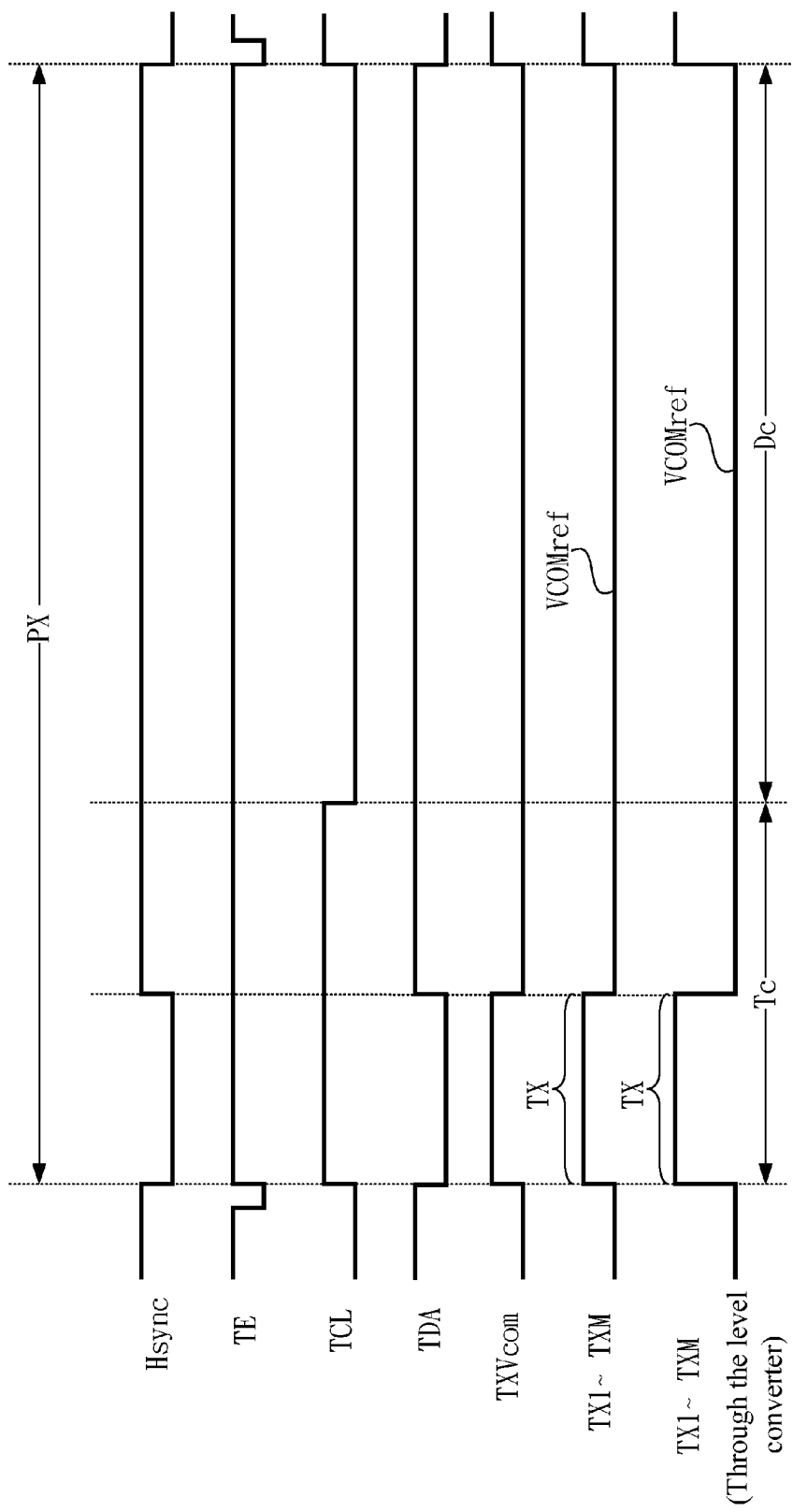
FIG. 7 illustrates a schematic view of timing of partial signals of a touch display apparatus according to an embodiment of the disclosure.

Referring to FIG. 7, it illustrates a schematic view of timing of partial signals in the touch display apparatus 500 according to an embodiment of the disclosure. A display driving circuit 540 generates a driving synchronous pulse TE corresponding to a pixel driving period (referring to the pixel driving period PX of the previous embodiments shown in FIGS. 3 and 4) of each of the pixel units. A touch sensing circuit 560 receives the driving synchronous pulse TE and is then synchronized with the display driving circuit 540. After the synchronization the touch sensing circuit 560 feeds back a touch control signal TXVCOM to the display driving circuit 540.

In this embodiment, the pulse synchronization between the display driving circuit 540 and the touch sensing circuit 560 is performed as the touch sensing circuit 560 exchanges at least one pulse synchronous signal (in this embodiment is a TCL pulse signal and a TDA pulse signal, as shown in FIG. 7) with the display driving circuit 540 based on the driving synchronous pulse TE. In the actual application, the TCL pulse signal and the TDA pulse signal are signals at touch interfaces (touch I/F signal) of the touch sensing circuit 560.

Then the touch sensing circuit 560 feeds back the touch control signal TXVCOM to the display driving circuit 540. In the embodiment of FIG. 7, when the TCL pulse signal is at a high level and the TDA pulse signal is at a low level, the touch sensing circuit 560 feeds back the touch control signal TXVCOM to the display driving circuit 540. After the synchronization the display driving circuit 540 selectively and sequentially transmits the touch transmission signal TX through a group of touch transmission lines TX1-TXM to N common electrode lines of common electrode lines Vcom$_1$-Vcom$_{M*N}$ according to the touch control signal TXVCOM fed back by the touch sensing circuit 560.

Furthermore, the touch display apparatus 500 also may include a level converter 590 coupled between the display driving circuit 540 and the common electrode lines Vcom$_1$-Vcom$_{M*N}$, for adjusting the voltage levels of the touch transmission signals TX on the touch transmission lines TX1-TXM.

In this embodiment, a processing unit 544 of the display driving circuit 540 includes a counter 546. The counter 546 starts to count when the display driving circuit 540 transmits the touch transmission signal TX to N common electrode lines in one group. When successive N pixel driving periods PX are reached, the display driving circuit 540 transmits the touch transmission signal TX to N common electrode lines in the next group and the counter 546 recounts.

As such, the display driving circuit 540 and the touch sensing circuit 560 can time-sharing control the common electrode lines Vcom$_1$-Vcom$_{M*N}$ to transmit the touch transmission signal TX in the touch section Tc and set the common electrode lines Vcom$_1$-Vcom$_{M*N}$ at a common voltage level VCOMref in the display section Dc. Moreover, the display driving circuit 540 performs timing synchronization through the timing synchronization unit 542 and the timing synchronization unit 562 of the touch sensing circuit 560, so that the touch transmission signal TX for the touch sensing function and the common voltage level VCOMref for the display function can be synchronized at a correct pulse and share a same common electrode line. In this embodiment, details of operation of other components are similar to those in the touch display apparatus 100 of the foregoing embodiments, which can be known by referring to the foregoing embodiments and will not be described here anymore.

Figure 8:
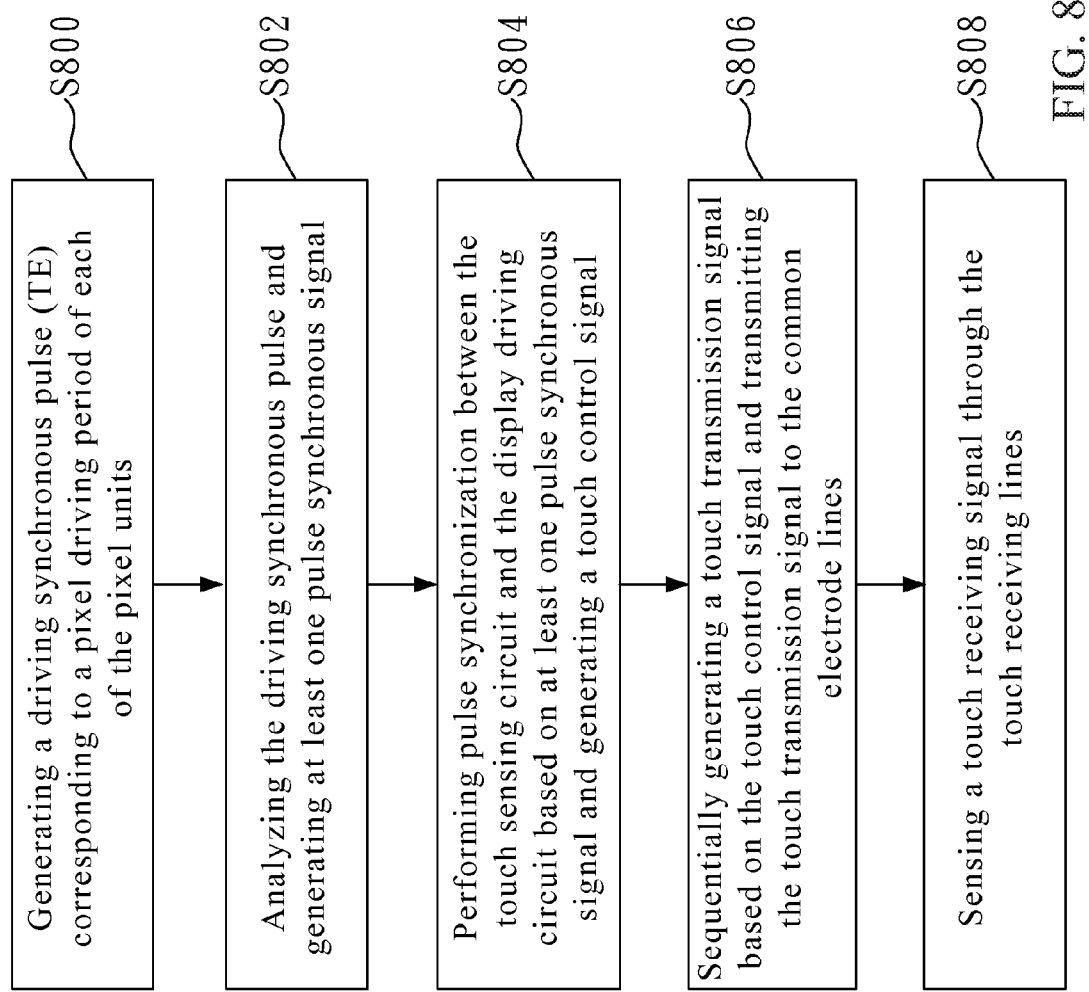
FIG. 8 illustrates a flow chart of a display-driving method according to an embodiment of the disclosure.

Referring to FIG. 8, it illustrates a flow chart of a display-driving method. The display-driving method is applied on a display apparatus which integrates a touch control function (e.g., the touch display apparatus 100 or touch display apparatus 500 of the foregoing embodiments), and the detailed structure of the display apparatus can be known by referring to the foregoing embodiments and will not be described here anymore.

Figure 9:
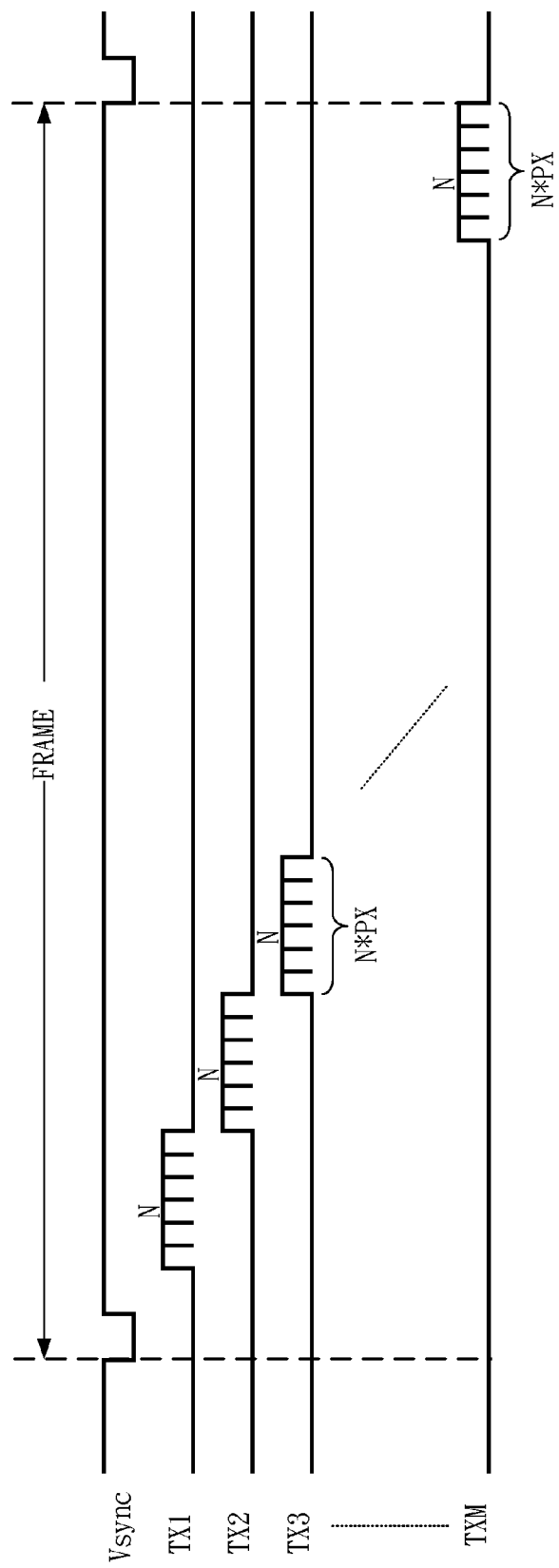
FIG. 9 illustrates a schematic view of the number of transmitting the touch transmission signal in one frame period according to an embodiment of the disclosure.

Referring to FIG. 9, it illustrates a schematic view of the number of transmitting the touch transmission signal TX in one frame period FRAME (i.e., the number of sampling for touch sensing) according to an embodiment of the disclosure.

In the display-driving method, the step S800 is performed, generating a driving synchronous pulse (TE) corresponding to a pixel driving period of each of the pixel units. The display apparatus includes M*N common electrode lines. The M*N common electrode lines are divided into M groups, and each group of common electrode lines includes N common electrode lines. Each frame period FRAME consists of M*N pixel driving periods. Each pixel driving period further includes a touch section and a display section. In the touch section the touch transmission signal is sequentially transmitted to the common electrode lines, and in the display section the display driving circuit drives the pixel units through the data lines and the scan lines, and the common electrode lines are set at a common voltage level.

The step S802 is performed, analyzing the driving synchronous pulse and generating at least one pulse synchronous signal. The step S804 is performed, performing pulse synchronization between the touch sensing circuit and the display driving circuit based on at least one pulse synchronous signal and generating a touch control signal. The step S806 is performed, sequentially generating a touch transmission signal based on the touch control signal and transmitting the touch transmission signal to the common electrode lines. The step S808 is performed, sensing a touch receiving signal through the touch receiving lines.

In an embodiment, a display apparatus where the display-driving method is available (referring to the touch display apparatus 100 of the foregoing embodiments) further includes a control circuit. The control circuit receives and analyzes the driving synchronous pulse to generate at least one pulse synchronous signal, and transmits the pulse synchronous signal to the touch sensing circuit. The touch sensing circuit is synchronized with the control circuit and the display driving circuit based on the at least one pulse synchronous signal and feeds back a touch control signal to the control circuit.

In another embodiment, in a display apparatus where the display-driving method is available (referring to the touch display apparatus 500 of the foregoing embodiments), the touch sensing circuit is synchronized with the display driving circuit by exchanging at least one pulse synchronous signal with the display driving circuit based on the driving synchronous pulse and feeds back a touch control signal to the display driving circuit.

In the embodiment of FIG. 9, in a single frame period FRAME (in the actual application is between two activations of signal Vsync), in the (t)th group of N successive pixel driving periods the touch transmission signal is transmitted to N common electrode lines in the (t)th group, and the transmission is sequentially repeated for M times, wherein t is a positive integer varied from 1 to M. That is, a touch sampling is first performed to N common electrode lines in the first group for N times, and then a touch sampling is performed to N common electrode lines in the second group for N times, and the process is ended until a touch sampling is performed to N common electrode lines in the (M)th group for N times. As such, in the embodiment of FIG. 9, each time the touch sampling is performed to N common electrode lines in each group for N times, so as to complete a full panel touch scanning in a single frame period FRAME. Therefore, N touch sampling values are obtained totally from the N common electrode lines in each group, but the disclosure is not limited to this.

Figure 10:
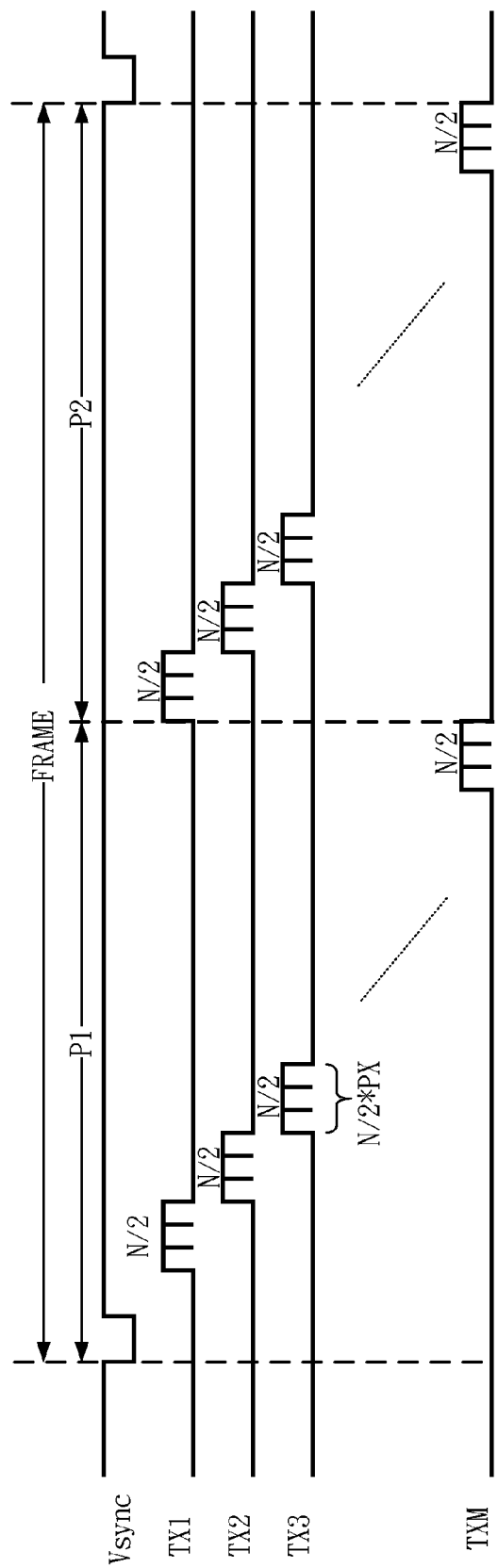
FIG. 10 illustrates a schematic view of the number of transmitting the touch transmission signal in one frame period according to another embodiment of the disclosure.

In the actual application, in order to sense a touch node moving at a high speed, the disclosure provides a scheme which can improve the scanning frequency of touch scanning. Referring to FIG. 10, it illustrates a schematic view of the number of transmitting the touch transmission signal TX in one frame period FRAME (i.e., the number of sampling for touch sensing) according to another embodiment of the disclosure.

As shown in FIG. 10, in the first portion P1 as the first half section of the frame period FRAME, during the successive the (N/2) pixel driving periods of the (t)th group, the touch transmission signal is transmitted to the N common electrode lines in the (t)th group, wherein the process is sequentially repeated for M times, and t is a positive integer varied from 1 to M.

In the second portion P2 as the second half section of the frame period FRAME, during the successive the (N/2) pixel driving periods of the (t)th group, the touch transmission signal is transmitted again to the N common electrode lines in the (t)th group, wherein the process is sequentially repeated for M times, and t is a positive integer varied from 1 to M.

As such, the scanning frequency of the touch scanning in the embodiment of FIG. 10 is twice the scanning frequency in the embodiment of FIG. 9; in a single frame period FRAME the full panel touch scanning is completed for two times; and (N/2) touch sampling values are obtained totally from the N common electrode lines in each group, which is beneficial for acquiring the touch node moving at a high speed.

Similarly, the display-driving method can further divide the frame period FRAME into k portions, wherein k is a positive divisor of M. In successive (N/k) pixel driving periods in each of the k portions, the touch transmission signal is transmitted to the N common electrode lines in the (t)th group, and this process is sequentially repeated for M times, totally M*k times with respect to the entire frame period, wherein t is varied from 1 to M. In this embodiment, k is multiple of the scanning frequency. Accordingly, the touch scanning frequency of this display-driving method can be improved to k times of that in the embodiment of FIG. 9; in a single frame period FRAME the full panel touch scanning is completed for k times; and (N/k) touch sampling values are obtained totally from the N common electrode lines in each group.

In view of the above, the disclosure provides a display apparatus which integrates a touch function and a display-driving method which integrates touch signal control, and an in-cell capacitive touch display apparatus structure is also disclosed. In this structure, a common voltage signal and a touch transmission signal (such as a TX signal sensed by a capacitive touch) is time-sharing transmitted through a common electrode line in the display apparatus; a touch receiving line is additionally configured for receiving a fed-back touch receiving signal (such as an RX signal sensed by a capacitive touch); and a coupling capacitance disposed between the common electrode line and the touch receiving line is configured for touch sensing. In the structure of the disclosure, the touch transmission signal and the common voltage signal used for displaying share the same common electrode line; and a synchronous communication mechanism is established between the touch sensing circuit and the display driving circuit to perform timing distribution for the common electrode line and avoid mutual interference among different signals. Furthermore, the disclosure further provides a mechanism dividing the common electrode line into multiple groups and then scanning each thereof.

Although the disclosure has been disclosed with reference to the above embodiments, these embodiments are not intended to limit the disclosure. It will be apparent to those of skills in the art that various modifications and variations can be made without departing from the spirit and scope of the disclosure. Therefore, the scope of the disclosure shall be defined by the appended claims.

What is claimed is:

1. A touch display apparatus, comprising:
a panel module comprising a plurality of pixel units, a plurality of common electrode lines and a plurality of touch receiving lines, the common electrode lines being disposed perpendicular to the touch receiving lines;
a display driving circuit coupled to the panel module and configured for driving the pixel units;
a control circuit coupled to the display driving circuit and the common electrode lines, the control circuit being configured for driving the common electrode lines; and
a touch sensing circuit coupled to the control circuit and the touch receiving lines;
wherein the display driving circuit generates a driving synchronous pulse corresponding to a pixel driving period of each of the pixel units, the control circuit receives the driving synchronous pulse and accordingly the control circuit is synchronized with the touch sensing circuit, and after the synchronization the control circuit selectively and sequentially transmits a touch transmission signal to the common electrode lines according to a touch control signal fed back from the touch sensing circuit,
wherein the control circuit receives and analyzes the driving synchronous pulse to generate at least one pulse synchronous signal and transmits the pulse synchronous signal to the touch sensing circuit, and the touch sensing circuit is synchronized with the control circuit and the display driving circuit based on the at least one pulse synchronous signal and feeds back the touch control signal to the control circuit.

2. The touch display apparatus of claim 1, further comprising a level converter coupled between the control circuit and the common electrode lines for adjusting a voltage level of the touch transmission signal.

3. The touch display apparatus of claim 1, wherein the panel module further comprises a plurality of data lines and a plurality of scan lines corresponding to the pixel units, and the pixel driving period further comprises a touch section and a display section, wherein in the touch section the control circuit selectively and sequentially transmits the touch transmission signal to the common electrode lines according to the touch control signal, and in the display section the display driving circuit drives the pixel units through the data lines and the scan lines, and the control circuit sets the common electrode lines at a common voltage level.

4. The touch display apparatus of claim 1, wherein the common electrode lines comprise M*N common electrode lines, and the M*N common electrode lines are divided into M groups each comprising N common electrode lines, wherein M and N are positive integers, and during successive N pixel driving periods, in the touch section the control circuit transmits the touch transmission signal generated according to the touch control signal to N common electrode lines in one group.

5. The touch display apparatus of claim 4, wherein the control circuit comprises a counter which starts to count when the control circuit transmits the touch transmission signal to N common electrode lines in one group; and when successive N pixel driving periods are reached, the control circuit transmits the touch transmission signal to N common electrode lines in the next group and the counter recounts.

6. A touch display apparatus, comprising:
a panel module comprising a plurality of pixel units, a plurality of common electrode lines and a plurality of touch receiving lines, the common electrode lines being disposed perpendicular to the touch receiving lines;
a display driving circuit coupled to the panel module and the common electrode lines, the display driving circuit being configured for driving the pixel units; and
a touch sensing circuit coupled to the display driving circuit and the touch receiving lines;
wherein the display driving circuit generates a driving synchronous pulse corresponding to a pixel driving period of each of the pixel units, the touch sensing circuit receives the driving synchronous pulse and accordingly the touch sensing circuit is synchronized with the display driving circuit, and after the synchronization the display driving circuit selectively and sequentially transmits a touch transmission signal to the common electrode lines according to a touch control signal fed back from the touch sensing circuit,
wherein the common electrode lines comprise M*N common electrode lines, and the M*N common electrode lines are divided into M groups each comprising N common electrode lines, and during successive N pixel driving periods, in the touch section the display driving circuit transmits the touch transmission signal generated according to the touch control signal to N common electrode lines in one group, wherein M and N are positive integers, and
wherein the touch display apparatus further comprises a counter which starts to count when the display driving circuit transmits the touch transmission signal to N common electrode lines in one group; and when successive N pixel driving periods are reached, the display driving circuit transmits the touch transmission signal to N common electrode lines in the next group and the counter recounts.

7. The touch display apparatus of claim 6, wherein the display driving circuit further comprises a level converter coupled to the common electrode lines for adjusting a voltage level of the touch transmission signal.

8. The touch display apparatus of claim 6, wherein the touch sensing circuit is synchronized with the display driving circuit by exchanging at least one pulse synchronous signal with the display driving circuit and feeds back the touch control signal to the display driving circuit.

9. The touch display apparatus of claim 6, wherein the panel module further comprises a plurality of data lines and a plurality of scan lines corresponding to the pixel units, and the pixel driving period further comprises a touch section and a display section, wherein in the touch section the control circuit selectively and sequentially transmits the touch transmission signal to the common electrode lines according to the touch control signal, and in the display section the display driving circuit drives the pixel units through the data lines and the scan lines, and the display driving circuit sets the common electrode lines at a common voltage level.

10. A display-driving method applied to a display apparatus which integrates a touch control function, wherein the display apparatus comprises a plurality of pixel units, a plurality of common electrode lines, a plurality of scan lines, a plurality of touch receiving lines, a display driving circuit and a touch sensing circuit, and the display-driving method comprises:

generating a driving synchronous pulse corresponding to a pixel driving period of each of the pixel units;

analyzing the driving synchronous pulse and generating at least one pulse synchronous signal;

performing pulse synchronization between the touch sensing circuit and the display driving circuit based on at least one pulse synchronous signal and generating a touch control signal;

sequentially generating a touch transmission signal based on the touch control signal and transmitting the touch transmission signal to the common electrode lines; and sensing a touch receiving signal through the touch receiving lines, wherein the display apparatus further comprises a control circuit, the control circuit receives and analyzes the driving synchronous pulse to generate at least one pulse synchronous signal and transmits the pulse synchronous signal to the touch sensing circuit, and the touch sensing circuit is synchronized with the control circuit and the display driving circuit based on the at least one pulse synchronous signal and feeds back the touch control signal to the control circuit.

11. The display-driving method of claim 10, wherein the common electrode lines comprise M*N common electrode lines, the M*N common electrode lines are divided into M groups each comprising N common electrode lines, and each frame period consists of M*N pixel driving periods, wherein M and N are positive integers, and the step of generating and transmitting the touch transmission signal to the common electrode lines further comprises:

in the frame period, during the successive N pixel driving periods of the (t)th group, transmitting the touch transmission signal to the N common electrode lines in the (t)th group, wherein the process is sequentially repeated for M times, and t is a positive integer varied from 1 to M.

12. The display-driving method of claim 10, wherein the common electrode lines comprise M*N common electrode lines, the M*N common electrode lines are divided into M groups each comprising N common electrode lines, and each frame period consists of M*N pixel driving periods, wherein M and N are positive integers, and the step of generating and transmitting the touch transmission signal to the common electrode lines further comprises:

in the first section of the frame period, during the successive (N/2) pixel driving periods of the (t)th group, transmitting the touch transmission signal to the N common electrode lines in the (t)th group, wherein the process is sequentially repeated for M times, and t is a positive integer varied from 1 to M; and in the second section of the frame period, during the successive (N/2) pixel driving periods of the (t)th group, transmitting the touch transmission signal to the N common electrode lines in the (t)th group again, wherein the process is sequentially repeated for M times, and t is a positive integer varied from 1 to M.

13. The display-driving method of claim 10, wherein the common electrode lines comprise M*N common electrode lines, the M*N common electrode lines are divided into M groups each comprising N common electrode lines, and each frame period consists of M*N pixel driving periods, wherein M and N are positive integers, and the step of generating and transmitting the touch transmission signal to the common electrode lines further comprises:

dividing the frame period into k portions, wherein k is a positive divisor of M; and In successive (N/k) pixel driving periods in each of the k portions, transmitting the touch transmission signal to the N common electrode lines in the (t)th group, wherein the process is sequentially repeated for M times, totally M*k times with respect to the entire frame period, and t is a positive integer varied from 1 to M.

14. The display-driving method of claim 13, wherein k is multiple of a scanning frequency.

15. The display-driving method of claim 10, wherein the touch sensing circuit is synchronized with the display driving circuit by exchanging at least one pulse synchronous signal with the display driving circuit and feeds back the touch control signal to the display driving circuit.

16. The display-driving method of claim 10, wherein the pixel driving period further comprises a touch section and a display section, in the touch section the touch transmission signal is sequentially transmitted to the common electrode lines, and in the display section the display driving circuit drives the pixel units through the data lines and the scan lines, and the common electrode lines are set at a common voltage level.

* * * * *